US012759861B2

(12) United States Patent
Griffith

(10) Patent No.: US 12,759,861 B2
(45) Date of Patent: Oct. 13, 2026

(54) LIQUID DISPENSING SYSTEM

(71) Applicant: Hydration Components LLC, Lumberton, TX (US)

(72) Inventor: Thomas Christopher Griffith, Beaumont, TX (US)

(73) Assignee: Hydration Components LLC, Lumberton, TX (US)

( * ) Notice: Subject to any disclaimer, the term of this patent is extended or adjusted under 35 U.S.C. 154(b) by 570 days.

(21) Appl. No.: 18/122,051

(22) Filed: Mar. 15, 2023

(65) Prior Publication Data

US 2023/0294975 A1 Sep. 21, 2023

Related U.S. Application Data

(60) Provisional application No. 63/320,578, filed on Mar. 16, 2022.

(51) Int. Cl.

*B67D 3/00* (2006.01)
*B67D 1/08* (2006.01)
*B67D 3/04* (2006.01)

(52) U.S. Cl.

CPC ......... *B67D 3/0058* (2013.01); *B67D 1/0887* (2013.01); *B67D 3/04* (2013.01); *B67D 2210/00094* (2013.01)

(58) Field of Classification Search

CPC .................... B67D 3/0058; B67D 3/04; B67D 2210/00094; B67D 1/0887

See application file for complete search history.

(56) References Cited

U.S. PATENT DOCUMENTS

| | | | | | | |
|---|---|---|---|---|---|---|
| 2,488,266 | A | * | 11/1949 | Brenn | A47K 5/1205 | 222/341 |
| 3,220,613 | A | * | 11/1965 | Palmer | B65D 83/184 | 222/509 |
| 3,233,787 | A | * | 2/1966 | Ross | A47K 5/1205 | 222/179 |
| 3,313,516 | A | * | 4/1967 | Peterson | B67D 3/045 | 251/243 |
| 4,077,549 | A | * | 3/1978 | Beard | B05B 11/1057 | 222/402.15 |
| 4,079,862 | A | * | 3/1978 | Fegley | B65D 83/267 | 222/162 |
| 4,092,000 | A | * | 5/1978 | Offutt, III | B65D 83/184 | 251/294 |
| 4,186,855 | A | * | 2/1980 | Edman | B05B 11/1057 | 222/472 |
| 4,248,360 | A | * | 2/1981 | Crump | B65D 83/18 | 222/402.15 |
| 4,615,476 | A | * | 10/1986 | Hobbs | A47K 5/1211 | 222/153.09 |

(Continued)

FOREIGN PATENT DOCUMENTS

| | | | | | |
|---|---|---|---|---|---|
| EP | 884269 | A1 | * | 12/1998 | |
| EP | 1201601 | A1 | * | 5/2002 | B67D 3/04 |

(Continued)

*Primary Examiner* — Frederick C Nicolas

(74) *Attorney, Agent, or Firm* — Fletcher Yoder, PC

(57) ABSTRACT

A spigot cover includes a mounting portion configured to mount to a spigot of a liquid container and includes an actuating portion adjustably coupled to the mounting portion. The actuating portion includes a protrusion configured to engage with a plunger of the spigot.

20 Claims, 12 Drawing Sheets

(56) References Cited

U.S. PATENT DOCUMENTS

| | | | | | |
|---|---|---|---|---|---|
| 4,651,902 | A * | 3/1987 | Hobbs | A47K 5/1211 | 222/153.09 |
| 4,715,516 | A * | 12/1987 | Salvail | B67D 3/044 | 222/487 |
| 4,903,863 | A * | 2/1990 | Fink | B65D 83/267 | 222/61 |
| 4,905,875 | A * | 3/1990 | Straiton | B67D 3/042 | 141/354 |
| 5,102,017 | A * | 4/1992 | Dirksing | B67D 3/042 | 222/509 |
| 5,242,090 | A * | 9/1993 | Reyss | B65D 83/206 | 222/402.15 |
| 5,370,281 | A * | 12/1994 | Renault | B05B 11/00442 | 222/341 |
| 5,402,919 | A * | 4/1995 | Atkinson | B67D 3/04 | 222/402.15 |
| 5,542,584 | A * | 8/1996 | Konar | B65D 77/067 | 222/505 |
| 5,797,524 | A * | 8/1998 | Lentz | B67D 3/042 | 251/285 |
| 5,839,616 | A * | 11/1998 | Irwin | B05B 11/1057 | 222/321.8 |
| 6,003,742 | A * | 12/1999 | Garcia | B67D 3/042 | 222/508 |
| 6,126,046 | A * | 10/2000 | Baculy | B67D 3/043 | 251/238 |
| 6,247,620 | B1 * | 6/2001 | Makainai | B67D 1/06 | 222/509 |
| 6,318,600 | B1 * | 11/2001 | Winnett | B65D 83/386 | 222/402.1 |
| 6,708,845 | B2 * | 3/2004 | Weng | A47K 10/32 | 222/61 |
| 7,040,510 | B1 * | 5/2006 | Hester | B05B 11/1056 | 222/509 |
| 7,252,210 | B1 * | 8/2007 | Schultz | B65D 83/184 | 222/174 |
| 7,314,149 | B1 * | 1/2008 | White | B65D 83/184 | 222/402.15 |
| 7,717,300 | B1 * | 5/2010 | Yarrusso, Jr. | A01M 1/2038 | 43/132.1 |
| 8,944,094 | B2 * | 2/2015 | Johnson | F16L 37/084 | 137/380 |
| 9,157,549 | B2 * | 10/2015 | Ashby | F16K 31/62 | |
| 11,370,650 | B2 * | 6/2022 | Currie | B67D 3/0058 | |
| 12,318,022 | B2 * | 6/2025 | McSmith | A47F 5/16 | |
| 2005/0199653 | A1 * | 9/2005 | Warner | B65D 83/184 | 222/174 |
| 2006/0113327 | A1 * | 6/2006 | Walters | B05B 11/1014 | 222/153.11 |
| 2006/0138176 | A1 * | 6/2006 | Lasserre | B05B 11/1059 | 222/321.8 |
| 2006/0180612 | A1 * | 8/2006 | Paas | B65D 83/206 | 222/402.15 |
| 2007/0096046 | A1 * | 5/2007 | Dubois | B67D 3/04 | 251/90 |
| 2009/0097901 | A1 * | 4/2009 | McCarthy | B65D 83/184 | 222/174 |
| 2011/0079617 | A1 * | 4/2011 | Quarles | B65D 83/18 | 222/402.15 |

FOREIGN PATENT DOCUMENTS

| | | | | |
|---|---|---|---|---|
| FR | 2885897 | A1 * | 11/2006 | B67D 3/04 |
| WO | WO-9515915 | A1 * | 6/1995 | B67D 3/04 |

* cited by examiner

LIQUID DISPENSING SYSTEM

CROSS REFERENCE TO RELATED PATENT APPLICATIONS

This application claims priority from and the benefit of U.S. Provisional Application No. 63/320,578, entitled "LIQUID DISPENSING SYSTEM," filed Mar. 16, 2022, which is hereby incorporated by reference in its entirety for all purposes.

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Liquid dispensing containers are utilized to provide clean, potable liquids or beverages on location for individuals within residential, social, commercial, and industrial environments. Oftentimes, individuals within these environments and/or the environments themselves may be exposed to a number of contaminants that may affect the liquid quality within the liquid dispensing containers. For example, in traditional liquid delivery systems, a spigot of a liquid dispensing container may be exposed to the surrounding environment, and an individual may actuate the spigot using their hand and/or fingers to dispense the liquid from the container. Contaminants present within the surrounding environment and/or on the hand of an individual using the liquid dispensing container may be transferred to the spigot, which may increase exposure of other individuals to the contaminants. Accordingly, it is now recognized that there is a desire for improved liquid dispensing systems.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a spigot cover includes a mounting portion configured to mount to a spigot of a liquid container and includes an actuating portion adjustably coupled to the mounting portion. The actuating portion includes a protrusion configured to engage with a plunger of the spigot.

In another embodiment, a liquid dispensing system includes a spigot cover configured to mount to a spigot of a liquid container and includes an actuation cable assembly configured to be secured to the spigot cover. The spigot cover is configured to actuate the spigot and to shield the spigot from contact with an individual utilizing the liquid dispensing system. The actuation cable assembly is configured to transfer a force to the spigot cover to actuate the spigot.

In a further embodiment, a liquid dispensing system includes a spigot cover configured to mount to a spigot of a liquid container. The spigot cover includes a first portion configured to mount to the spigot of the liquid container and includes a second portion adjustably coupled to the first portion. The second portion is configured to shield the spigot from contact with an individual utilizing the liquid dispensing system. The liquid dispensing system also includes an actuation cable assembly configured to couple to the spigot cover and configured to transfer a force to the second portion of the spigot cover to actuate the spigot. The liquid dispensing system further includes an actuation pedal configured to couple to the actuation cable assembly and configured to receive the force and transfer the force to the actuation cable assembly.

BRIEF DESCRIPTION OF THE DRAWINGS

Various aspects of this disclosure may be better understood upon reading the following detailed description and upon reference to the drawings in which.

DETAILED DESCRIPTION

Figure 1:
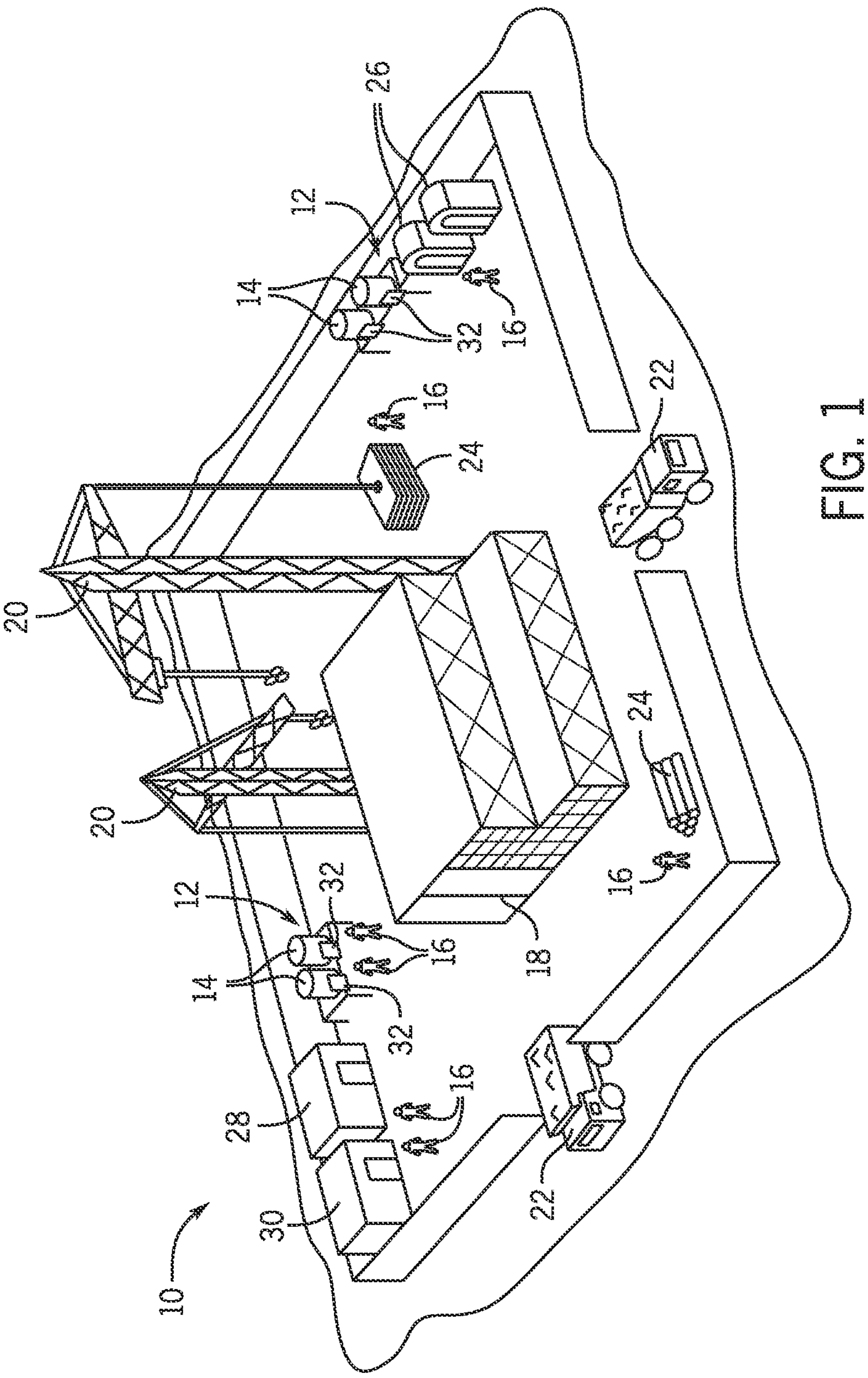
FIG. 1 is a schematic representation of an embodiment of an industrial environment having a liquid dispensing station with liquid dispensing systems, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

As used herein, the terms "approximately," "generally," and "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to mean that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to mean that the given feature is within +/−5%, within +/−4%, within +/−3%, within +/−2%, within +/−1%, or even closer, to having the described nature, such as being parallel to another feature, being perpendicular to another feature, and so forth. Further, it should be understood that mathematical terms, such as "planar," "slope," "perpendicular," "parallel," and so forth are intended to encompass features of surfaces or elements as understood to one of ordinary skill in the relevant art, and should not be rigidly interpreted as might be understood in the mathematical arts. For example, a "planar" surface is intended to encompass a surface that is machined, molded, or otherwise formed to be substantially flat or smooth (within related tolerances) using techniques and tools available to one of ordinary skill in the art. Similarly, a surface having a "slope" is intended to encompass a surface that is machined, molded, or otherwise formed to be oriented at an angle (e.g., incline) with respect to a point of reference using techniques and tools available to one of ordinary skill in the art.

The present disclosure is directed to a liquid dispensing system (e.g., fluid actuation system) having a spigot cover (e.g., liquid dispenser assembly, spigot actuator, etc.) configured to be disposed over a spigot of a liquid dispenser (e.g., liquid container, fluid container, fluid cooler, liquid source, etc.). Liquid containers and/or liquid dispensing containers may be utilized in various different settings and venues to provide potable liquids on location for numerous individuals. For example, liquid containers may be provided at construction sites, emergency relief sites, power plants, painting sites, sporting and entertainment venues, social gatherings, and the like to provide beverages for individuals at a desired location. Traditional liquid containers may include a spigot that is manually actuated to enable dispensing of the liquid within the liquid container. Unfortunately, the spigot may be exposed to the surrounding environment, which may thereby expose the spigot to contaminants (e.g., within the surrounding environment). Further, manual actuation of the spigot typically involves an individual engaging a plunger of the spigot with their hand and/or fingers, which may also introduce contaminants to the spigot. Thus, existing liquid containers are susceptible to contaminant exposure and transfer, which may increase exposure of individuals to contaminants.

Accordingly, embodiments of the present disclosure are directed to a liquid dispensing system including a spigot cover (e.g., spigot actuator, spigot assembly, etc.) configured to be disposed over a spigot of a liquid container. The spigot cover may be configured to shield the spigot of the liquid container from contact with individuals and from contaminants within a surrounding environment. The spigot cover may also be configured to actuate the spigot to enable dispensing of liquid from the liquid container. For example, the spigot cover may include a mounting portion configured to mount to the spigot of the liquid container (e.g., liquid source), as well as an actuating portion that is adjustably coupled to the mounting portion and is configured to engage with a plunger of the spigot to enable dispensing of liquid from the liquid container. The actuating portion may include a hood that defines a cavity and an opening. The hood may be configured to direct a liquid from the spigot, through the cavity, and out of the cavity via the opening. As described further below, the hood of the actuating portion may limit exposure of contaminants to the spigot (e.g., from the surrounding environment, from hands of an individual, etc.) by at least partially encapsulating the spigot, shielding the spigot from the surrounding environment, and/or blocking contact (e.g., physical contact, direct physical contact) between an individual and the spigot.

In some embodiments, the liquid dispensing system also includes an actuation cable secured to the spigot cover and configured to transfer a force to the spigot cover to actuate (e.g., move) the actuating portion of the spigot cover and thereby actuate (e.g., engage) the plunger of the spigot. The actuation cable may include a first end coupled to the spigot cover and a second end coupled to an actuation pedal (e.g., actuator, a foot pedal) of the liquid dispensing system. The actuation pedal is configured to receive a force and apply the force to the actuation cable, and the actuation cable is configured to transfer the force to the spigot cover to actuate the plunger. In this way, the liquid dispensing system and the spigot cover of the present disclosure reduce, limit, and/or block contact between the spigot and the surrounding environment and between the spigot and individuals utilizing the liquid container to dispense the liquid therein. Accordingly, present embodiments enable a reduction in exposure of the spigot to contaminants, which further reduces transfer of contaminants to individuals using the liquid container.

Turning now to the drawings, FIG. 1 is a schematic representation of an industrial environment 10 (e.g., a construction site, a warehouse, etc.) having hydration stations 12 with liquid containers 14 (e.g., liquid sources) that provide potable liquids (e.g., water) to one or more individuals 16 associated with the industrial environment 10. As illustrated, the industrial environment 10 may include a manufacture 18, operating equipment 20 (e.g., cranes, loaders, machinery, etc.), work vehicles 22, materials 24, restrooms 26, rest areas 28, and office space 30. The hydration stations 12 having the liquid containers 14 may be located in the industrial environment 10 based on respective locations of the manufacture 18, the operating equipment 20, the restrooms 26, the rest areas 28 and/or the office space 30. For example, the hydration stations 12 may be located a threshold distance (e.g., at least 30 feet) away from the manufacture 18 and/or the operating equipment 20 to limit an amount of interference between individuals 16 receiving potable liquids at the hydration stations 12 and the manufacture 18 and/or the operating equipment 20. In some embodiments, the hydration stations 12 may be located within a threshold distance (e.g., within 30 feet) from the restrooms 26, rest areas 28 and/or office space 30 to encourage individuals 16 to maintain desirable hydration levels.

Each of the liquid containers 14 may include a spigot assembly 32 (e.g., spigot cover, liquid dispensing assembly, spigot actuator, spigot actuation system, spigot cover assembly) configured to mount to the liquid container 14 and engage with a spigot of the liquid container 14 to enable dispensing of liquid from the liquid container 14. For example, the spigot assembly 32 may be a component of a liquid dispensing system in accordance with the presently disclosed techniques. The spigot assembly 32 may partially encapsulate and/or shield the spigot of the liquid container 14 and may include a protrusion configured to engage with a plunger of the spigot. In some embodiments, the spigot assembly 32 may be configured to transfer a force received via an actuation pedal or other actuator to the plunger of the spigot to dispense liquid from the liquid container 14. The spigot assembly 32 may limit an amount of contact between individuals 16 and the liquid container 14 spigot. In this way, the spigot assembly 32 reduces exposure of the spigot to contaminants. Further, the spigot assembly 32 may shield and/or cover the spigot of the liquid containers 14 from the surrounding environment, thereby further reducing contaminants introduced to individuals 16 and/or the liquid containers 14, as described in greater detail below. It should be noted that, although the liquid containers 14 having the spigot assembly 32 are associated with the industrial environment 10 in the illustrated embodiment, the spigot assembly 32 and liquid dispensing systems disclosed herein may be utilized with liquid containers 14 in various different commercial, residential, social, and/or industrial settings to provide potable liquids to one or more individuals at a desired location. That is, the spigot assembly 32 and liquid dispensing systems disclosed herein may be mounted to liquid containers 14 in any of a variety of job sites, events, venues, and settings to provide beverages to individuals while limiting an amount of contact between the liquid containers 14 and the surrounding environment and between individuals 16 and the liquid containers 14.

Figure 2:
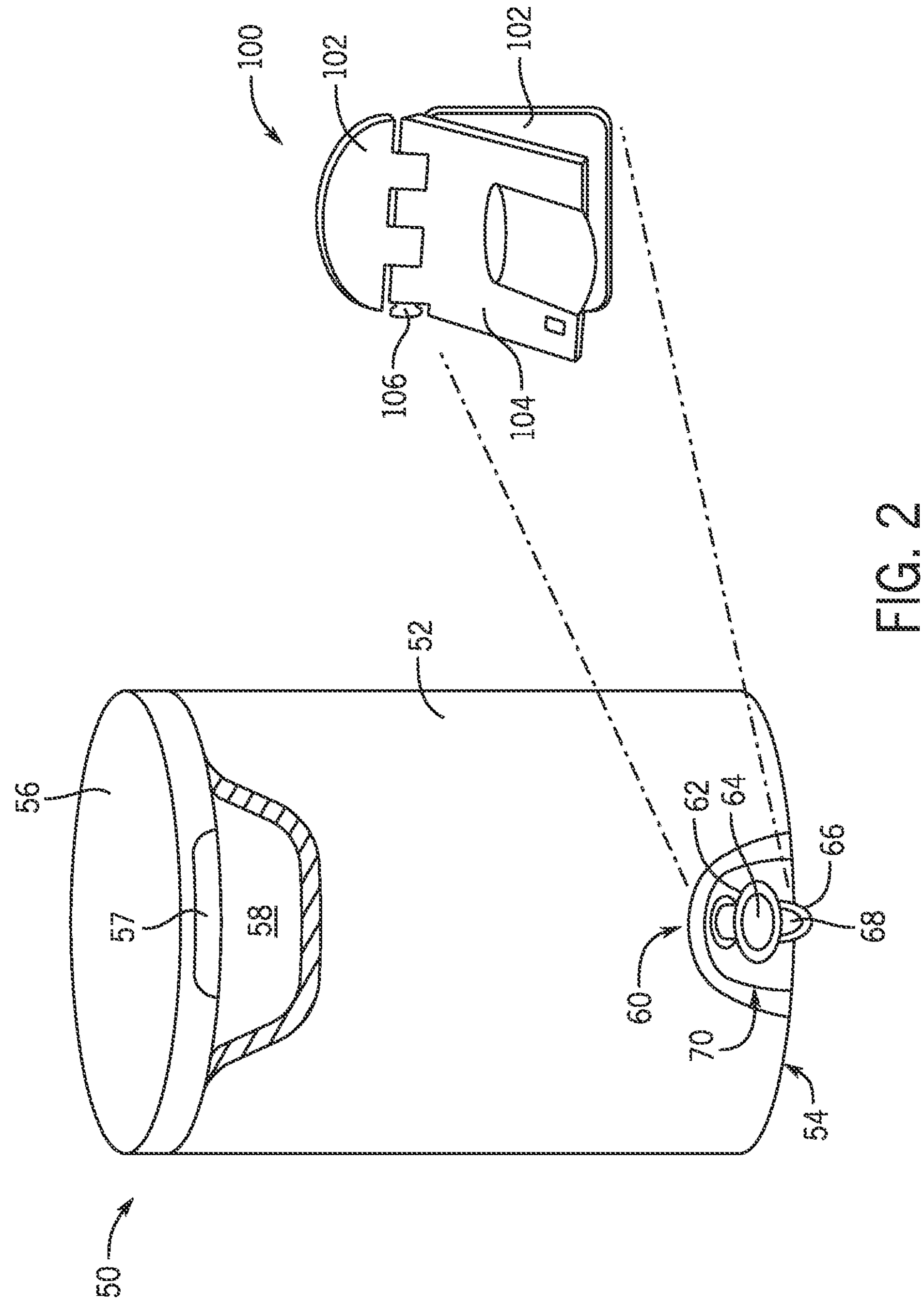
FIG. 2 is perspective view of an embodiment of a liquid dispensing container and a spigot cover of a liquid dispensing system, in accordance with an aspect of the present disclosure.

FIG. 2 is a perspective view of an embodiment of a liquid container 50 (e.g., liquid source, liquid carrier, liquid cooler, liquid dispenser) and a spigot cover 100 (e.g., spigot assembly, spigot actuator) in an uninstalled configuration, in accordance with embodiments of the present disclosure. The liquid container 50 may correspond to the liquid container 14 of FIG. 1, and the spigot cover 100 may be a component of the spigot assembly 32 of FIG. 1 and/or a component of a liquid dispensing system, in accordance with present embodiments. As illustrated, the liquid container 50 may include a body 52 extending from a base 54 of the liquid container 50. A lid 56 may be disposed at an end of the body 52 opposite the base 54, and the lid 56 may be shaped and configured to engage with the body 52 to seal an interior 58 (e.g., reservoir, inner volume) of the liquid container 50 from the surrounding environment. For example, the lid 56 may have a plug-like configuration and conform to the body 52 of the container 50, or the lid 56 may be threaded to match complimentary threads disposed along the body 52 of the container 50. The lid 56 may also include a recess 57 configured to enable a user to remove the lid 56 from the body 52 of the liquid container 50. The body 52 of the container 50 may be a single member composed of a metallic or polymeric material or multiple types of materials (e.g., metal and/or polymer layers). In some embodiments, the body 52 may include an insulating layer. The liquid container 50 may be any commercially available cooler that has a volume (e.g., 3 gallon, 5 gallon, 10 gallon) suitable to store a potable liquid for consumption by one or more individuals. That is, the liquid container 50 may be any suitable vessel configured to store and retain a liquid within the interior 58.

A spigot 60 (e.g., outlet, valve, spout, tap, etc.) may be positioned and coupled to the body 52 adjacent the base 54 of the liquid container 50, and the spigot 60 may be configured to dispense liquid from the interior 58 of the liquid container 50. That is, the spigot 60 may be in fluid communication with the interior 58 of the liquid container 50 to enable discharge of liquid from the interior 58 via the spigot 60. The spigot 60 may include a lip 62, a plunger 64, and a nozzle 66 (e.g., outlet) having an aperture 68 configured to enable liquid to flow therethrough. For example, a force may be applied to the plunger 64 of the spigot 60 (e.g., in an inward or radial direction relative the liquid container 50), and the plunger 64 may change position (e.g., depress) to enable fluid coupling of the interior 58 and the aperture 68 of the nozzle 66. In this way, liquid within the interior 58 of the liquid container 50 may flow through the nozzle 66 and out of the aperture 68 in a controlled manner. That is, the plunger 64 may be a push-button device configured to receive a force to enable liquid to flow from the interior 58, through the nozzle 66, and out of the aperture 68 (e.g., into a cup or other personal container). In some embodiments, the spigot 60 may be located within a recess 70 formed in the body 52 of the liquid container 50 to limit projection of the spigot 60 beyond the body 52 of the liquid container 50. In other embodiments, the spigot 60 may be flush mounted to the body 52 of the liquid container 50 and extend therefrom.

The spigot cover 100 may be configured to mount or couple to the spigot 60 in an installed configuration. The spigot cover 100 may include a mounting portion 102 and an actuating portion 104. The mounting portion 102 and the actuating portion 104 may be adjustably coupled to one another via a hinge pin 106 or other connection mechanism, thereby enabling the actuating portion 104 to move relative to the mounting portion 102. For example, the actuating portion 104 may be configured to rotate relative to the mounting portion 102 about the hinge pin 106. The mounting portion 102 of the spigot cover 100 may be configured to engage with the lip 62 of the spigot 60 to secure the spigot cover 100 to the liquid container 50, and the actuating portion 104 may be configured to engage with the plunger 64 of the spigot 60 to enable actuation of the plunger 64 and dispensing of liquid from the interior 58 of the liquid container 50, as described in greater detail below. In the installed configuration, the spigot cover 100 may be disposed over the spigot 60 and may be configured to at least partially encapsulate the spigot 60 to limit exposure of the spigot 60 to a surrounding environment. That is, the spigot cover 100 may be configured to shield the spigot 60 from the surrounding environment and limit contact between the spigot 60 and the surrounding environment and/or between the spigot 60 and one or more individuals receiving liquid from the liquid container 50. As a result, exposure of the spigot 60 to contaminants within the surrounding environment and/or contaminants carried by an individual is reduced and/or avoided. As described further below, the spigot cover 100 may be readily installed with and uninstalled from the spigot 60, thereby enabling use and re-use of the spigot cover 100 with numerous (e.g., different) liquid containers 50.

Figure 3:
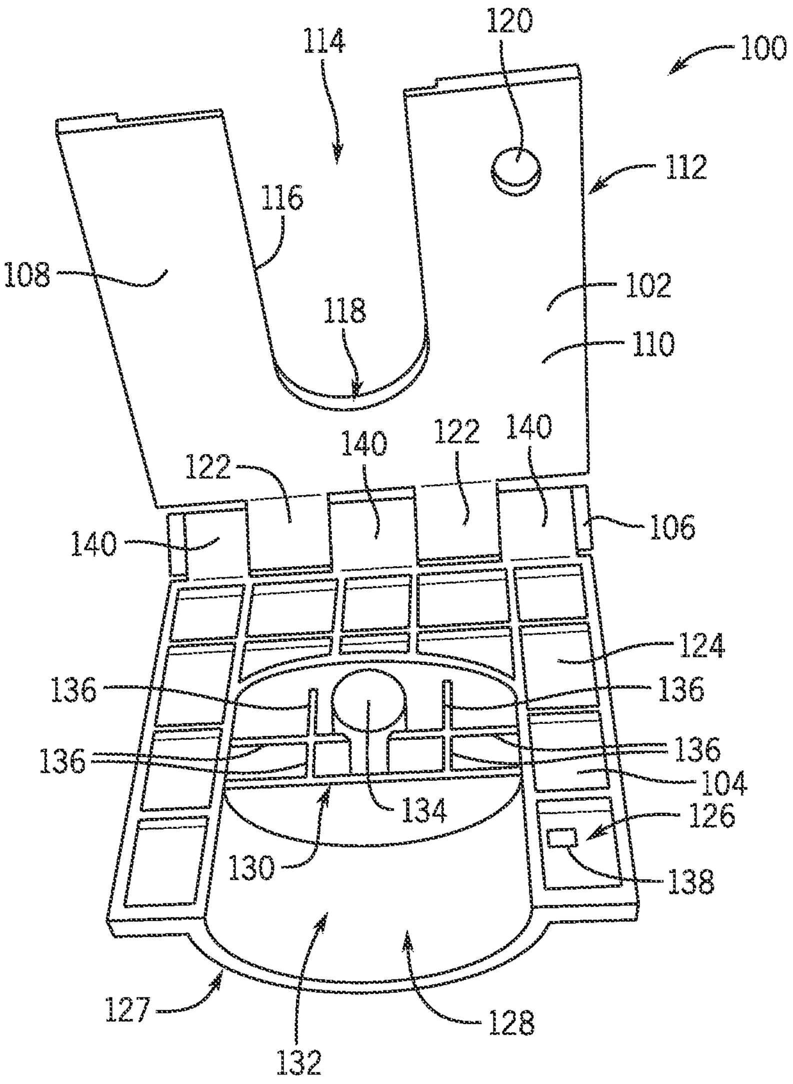
FIG. 3 is perspective view of an embodiment of a spigot cover of a liquid dispensing system, in accordance with an aspect of the present disclosure.

FIG. 3 is a perspective view of an embodiment of the spigot cover 100 in an uninstalled configuration. As illustrated, the spigot cover 100 may include the mounting portion 102, the actuating portion 104, and the hinge pin 106 configured to adjustably couple the mounting portion 102 to the actuating portion 104. As mentioned above, the actuating portion 104 may be configured to rotate around the hinge pin 106 (e.g., hinged connection) relative to the mounting portion 102. The mounting portion 102 may have a base 108 (e.g., main body, base portion) having a first surface 110 (e.g., interior surface, interior-facing surface) and a second surface 112 (e.g., exterior surface, mounting surface, exterior-facing surface). In some embodiments, the first surface 110 may be referred to as an exterior-facing surface that faces outward relative to the liquid container 50 (e.g., away from the body 52), and the second surface 112 may be referred to as an interior-facing surface that faces inward relative to the liquid container 50 (e.g., toward the body 52), in an installed configuration of the spigot cover 100.

As noted above, the mounting portion 102 may be configured to couple or mount to the spigot 60. The base 108 of the mounting portion 102 may include a recess 114 formed therein and configured to be disposed around or about the spigot 60 in the installed configuration. That is, the recess 114 may be sized such that components or features of the spigot 60 may engage with components of the mounting portion 102 to secure the mounting portion 102 and the spigot cover 100 to the spigot 60. For example, the mounting portion 102 may include a mounting flange 116 extending from the second surface 112 of the base 108 to define a mounting recess 118 configured to engage with the lip 62 of the spigot 60 and/or with another portion of the spigot 60. The mounting recess 118 may be configured to receive or capture the lip 62 of the spigot 60 such that a portion of the lip 62 (e.g., top portion) fits securely within the mounting recess 118, thereby securing the mounting portion 102 to the spigot 60. That is, the base 108 and the mounting flange 116 capture the lip 62 of the spigot 60 within the mounting recess 118. In some embodiments, the mounting flange 116 and the mounting recess 118 may each have a semi-circular geometry that enables the mounting recess 118 to partially circumferentially wrap around and receive the lip 62 of the spigot 60 to secure the mounting portion 102 to the liquid container 50. The mounting portion 102 may also include an aperture 120 configured to receive a cable therethrough (not shown). The cable may be coupled to the actuating portion 104 to enable transfer of a force via the cable to actuate the plunger 64 of the spigot 60, as described in greater detail below.

The actuating portion 104 may include a base 124 (e.g., base portion, main body) having a first surface 126 (e.g., interior surface, inward-facing surface) and a second surface 127 (e.g., exterior surface, externally-facing surface). A hood 128 may extend outward and/or project from the second surface 127 of the base 124. The hood 128 may define a cavity 130 and an opening 132 fluidly coupled to the cavity 130. In an installed configuration of the spigot cover 100 with the liquid container 50, the spigot 60 of the liquid container 50 may be disposed at least partially within the cavity 130. The hood 128 may be configured to direct and/or shield a liquid discharged from the spigot 60. In particular, a liquid discharged from the spigot 60 may flow through the cavity 130 and out of the opening 132. The actuating portion 104 may also include a protrusion 134 configured to engage with the plunger 64 of the spigot 60. The protrusion 134 may be at least partially disposed within the cavity 130 and may extend from the cavity 130 towards the mounting portion 102 in the assembled configuration of the spigot cover 100. Further, in some embodiments, the protrusion 134 may be supported by reinforcing ribs 136 extending from the hood 128 and/or the base 124 and through the cavity 130. For example, the reinforcing ribs 136 may extend from an interior surface of the hood 128 and/or the base 124 (e.g., first surface 126) and may be configured to provide structural rigidity to the actuating portion 102. The protrusion 134 further extends from the reinforcing ribs 136 in a direction towards the mounting portion 102 and/or towards the plunger 64 of the spigot 60 in an installed configuration of the spigot cover 100 with the liquid container 50. The protrusion 134 may also be configured to transfer a force to the plunger 64 of the spigot 60. In some embodiments, the protrusion 134 may contact and rest on or adjacent the plunger 64 in an unactuated or resting position. Upon application of a force (e.g., transferred from an actuation pedal to an actuation cable coupled to the actuating portion 104), the protrusion 134 may engage with the plunger 64 and transfer the force to the plunger 64 to depress the plunger 64 into an actuated position, as discussed in greater detail below. In some embodiments, the force may be manually applied to the actuating portion 104 via the second surface 127 of the base 124 (e.g., an outer surface of the hood 128), and the spigot cover 100 may block contact between the spigot 60 and an individual manually applying the force, as described in greater detail below. The actuating portion 104 may also include an aperture 138 configured to align with the aperture 120 of the mounting portion 102 in the installed configuration. The aperture 138 may be configured to enable coupling of an actuation cable to the base 124 (e.g., the second surface 127) of the actuating portion 104, thereby enabling transfer of a force from the actuation cable to the actuating portion 104, as discussed in greater detail below.

In some embodiments, the mounting portion 102 may include one or more connection joints 122 (e.g., coupling portions, hinge knuckles), and the actuating portion 104 may include one or more connection joints 140 (e.g., coupling portions, hinge knuckles). The connection joints 122, 140 may be configured to receive the hinge pin 106 (e.g., a bar, rod, link, etc.) to adjustably couple the mounting portion 102 to the actuating portion 104. That is, each of the connection joints 122, 140 may include or define a port (e.g., opening, aperture) configured to enable the hinge pin 106 to pass therethrough. For example, as illustrated, the hinge pin 106 may alternatingly pass through the connection joints 122, 140 of the mounting portion 102 and the actuating portion 104, thereby rotatably coupling the actuating portion 104 to the mounting portion 102 (e.g., enabling rotation of the actuating portion 104 relative to the mounting portion 102 about the hinge pin 106). As will be appreciated, the mounting portion 102, the actuating portion 104, and the hinge pin 106 may be formed from any suitable material. For example, the mounting portion 102, the actuating portion 104, and the hinge pin 106 may each be injection-molded parts formed from plastic or other polymer, metal (e.g., aluminum), and the like. In some embodiments, the mounting portion 102, the actuating portion 104, and/or the hinge pin 106 may each be formed from an additive manufacturing process using plastic or other polymer, metal, and the like. Various other components of the mounting portion 102 and the actuating portion 104 are described in greater detail with respect to FIGS. 4A-5C below.

Figure 4A:
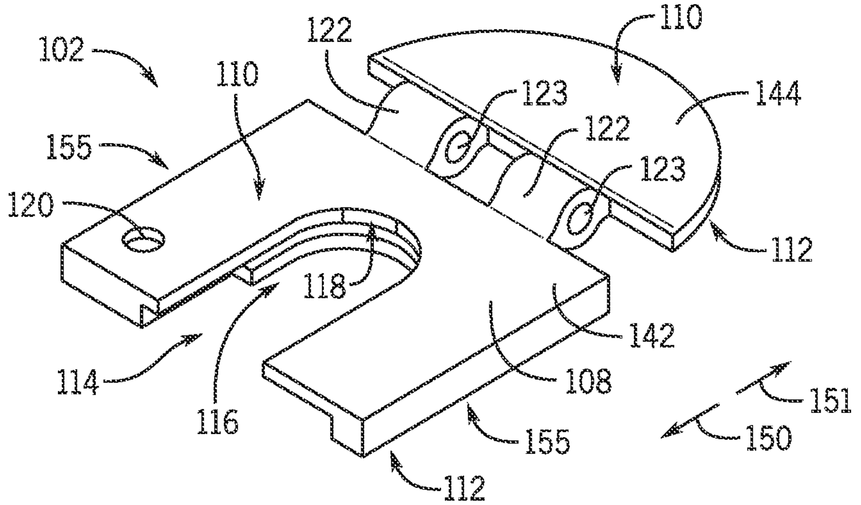
FIG. 4A is perspective view of an embodiment of a mounting portion of a spigot cover, in accordance with an aspect of the present disclosure.
Figure 4B:
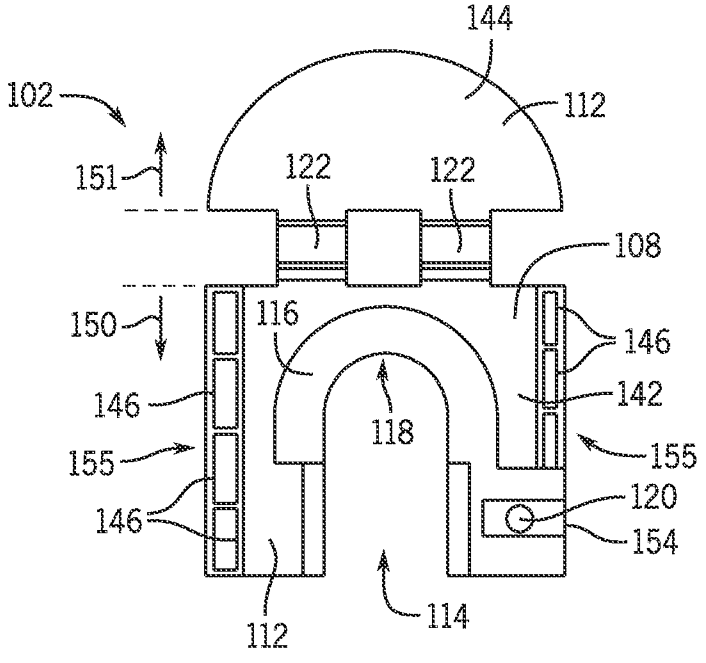
FIG. 4B is a rear view of an embodiment of a mounting portion of a spigot cover, in accordance with an aspect of the present disclosure.
Figure 4C:
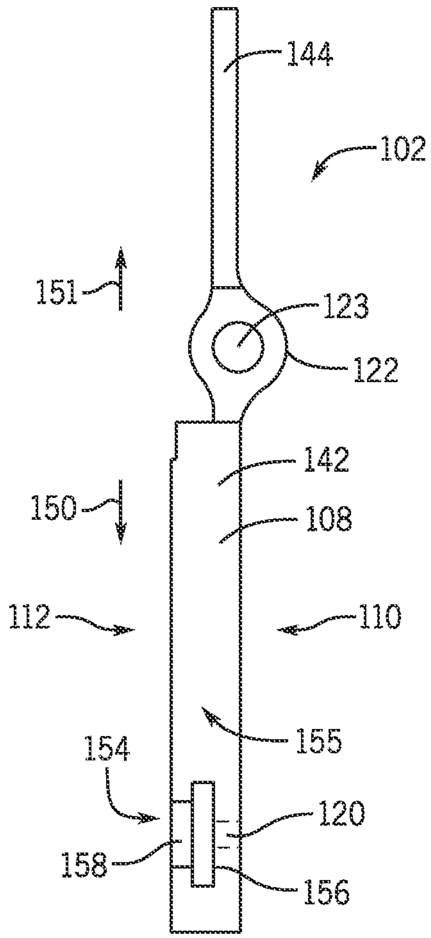
FIG. 4C is a side view of an embodiment of a mounting portion of a spigot cover, in accordance with an aspect of the present disclosure.

FIGS. 4A-4C illustrate various views of embodiments of the mounting portion 102 of the spigot cover 100. For example, FIG. 4A is a perspective view of an embodiment of the mounting portion 102, FIG. 4B is a rear view of an embodiment of the mounting portion 102, and FIG. 4C is a side view of an embodiment of the mounting portion 102. With reference to FIG. 4A, the mounting portion 102 may include the base 108 having the first surface 110 (e.g., interior surface, inward-facing surface relative to the spigot cover 100) and the second surface 112 (e.g., exterior surface, mounting surface, externally-facing surface relative to the spigot cover 100). Further, the mounting portion 102 may include the recess 114 formed in the base 108, the mounting flange 116 extending from the second surface 112 of the base 108, and the mounting recess 118 formed between the base 108 and the mounting flange 116. The mounting flange 116 may generally define the mounting recess 118. The mounting flange 116 and the mounting recess 118 may each have a semi-circular geometry and may be configured to receive, capture, and/or engage with the spigot 60 of the liquid container 50. For example, the mounting recess 118 may be configured to receive the lip 62 of the spigot 60, and the mounting flange 116 and the base 108 may capture the lip 62 of the spigot 60 within the mounting recess 118 to mount the mounting portion 102 to the spigot 60.

Further, the base 108 of the mounting portion 102 may include a first portion 142 and a second portion 144. The first portion 142 may include the mounting flange 116 and the mounting recess 118 and may be configured to couple (e.g., attach) to the spigot 60, as discussed above. The second portion 144 may be configured to abut the body 52 of the liquid container 50 to provide support and/or reinforcement in an installed configuration of the spigot cover 100 with the liquid container 50. The first portion 142 may be disposed on a first side 150 of the connection joints 122, and the second portion 144 may be disposed on a second side 151 of the connection joints 122 opposite the first side 150. Thus, in the installed configuration, the first portion 142 may be disposed on a first side of the hinge pin 106, and the second portion 144 may be disposed on a second side of the hinge pin 106. Further, as noted above, the connection joints 122 may each include a port 123 (e.g., a hole, an aperture, an opening) configured to receive the hinge pin 106, in an assembled configuration of the spigot cover 100.

FIG. 4B is a rear view of an embodiment of the mounting portion 102, illustrating the second surface 112 of the base 108. As discussed above, the mounting flange 116 may extend from the second surface 112 of the base 108. The mounting flange 116 may define the mounting recess 118 that is configured to receive the lip 62 of the spigot 60. As illustrated, the mounting flange 116 and the mounting recess 118 may each have a semi-circular geometry that enables the mounting flange 116 and the base 108 to capture at least a portion of the lip 62 of the spigot 60 within the mounting recess 118. In some embodiments, the mounting flange 116 and the mounting recess 118 may include other shapes or configurations that correspond to a geometry of other embodiments of the lip 62 and/or the spigot 60 to enable capture of the lip 62 within the mounting recess 118 and securement of the mounting portion 102 to the spigot 60. The base 108 of the mounting portion 102 may also include reinforcing ribs 146 configured to provide support and structural rigidity to the mounting portion 102. In some embodiments, the reinforcing ribs 146 may abut the body 52 of the liquid container 50 in an installed configuration of the spigot cover 100. Further, as noted above, in some embodiments, the spigot 60 of the liquid container 50 may be at least partially disposed within the recess 70 of the body 52 of the liquid container 50. Accordingly, in the installed configuration, the mounting flange 116 and the mounting recess 118 may extend from the second surface 112 of the mounting portion 102 and into the recess 70 of the liquid container 50, such that the mounting flange 116 and the mounting recess 118 may capture the lip 62 of the spigot 60 disposed within the recess 70.

The mounting portion 102 may also include a retention cavity 154 configured to capture and retain a bracket of an actuation cable assembly, as described further below. As noted above, the mounting portion 102 may include the aperture 120 configured to receive an actuation cable therethrough. The aperture 120 formed within the mounting portion 102 may be configured to align with the retention cavity 154 (e.g., in an unactuated or resting configuration of the spigot cover 100). For example, a bracket of an actuation cable assembly may be disposed within the retention cavity 154, and an actuation cable of an actuation cable assembly may extend through the bracket and through the aperture 120. The actuation cable may be secured to the actuating portion 104 to enable transfer of a force from the actuation cable to the actuating portion 104, as described in greater detail below. Further, as noted above, the mounting portion 102 may include the first portion 142 and the second portion 144. In the installed configuration, the first portion 142 may extend on the first side 150 of the connection joints 122 and align and/or overlap with the recess 70 of the liquid container 50 in which the spigot 60 is disposed. Thus, the mounting flange 116 and the base 108 may be configured to capture the lip 62 of the spigot 60 within the mounting recess 118 to mount the mounting portion 102 to the spigot 60. The second portion 144 may extend on the second side 151 of the connection joints 122, and the second surface 112 of the second portion 144 may be configured to abut the body 52 of the liquid container 50 to provide additional support for the mounting portion 102 in the installed configuration. That is, in the installed configuration, the second portion 144 may be configured to provide support to the mounting portion 102 by abutting the body 52 of the liquid container 50 and providing a reaction force or surface to balance the spigot cover 100 about the spigot 60 during application of a force to the plunger 64 of the spigot 60 via the actuating portion 104.

FIG. 4C is a side view of an embodiment of the mounting portion 102. As illustrated, the mounting portion 102 may include the retention cavity 154 formed within the base 108 and along a lateral side 155 of the base 108 of the mounting portion 102. The retention cavity 154 may have a generally T-shaped geometry such that the retention cavity 154 includes a first portion 156 and a second portion 158. The first portion 156 may be configured to retain a plate of a bracket of an actuation cable assembly, and the second portion 158 may be configured to enable an extension of the bracket to extend therethrough. As described in greater detail below, an actuation cable may extend through the bracket and the retention cavity 154, through the aperture 120, and towards the actuating portion 104.

Figure 5A:
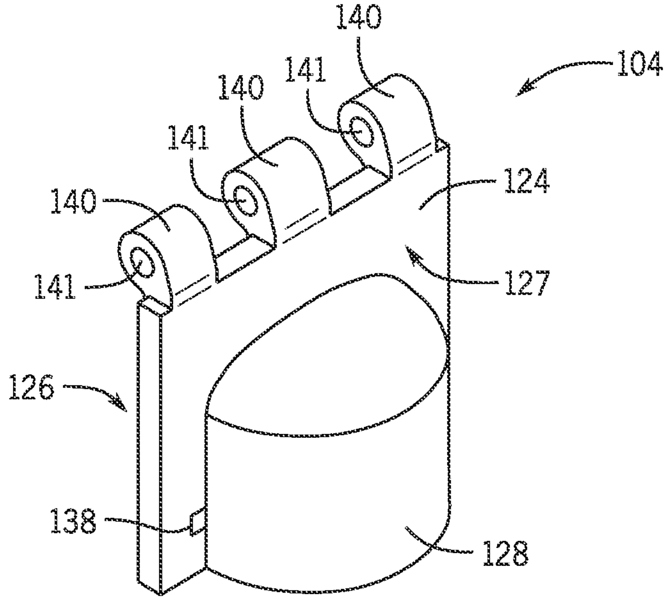
FIG. 5A is a perspective view of an embodiment of an actuating portion of a spigot cover, in accordance with an aspect of the present disclosure.
Figure 5B:
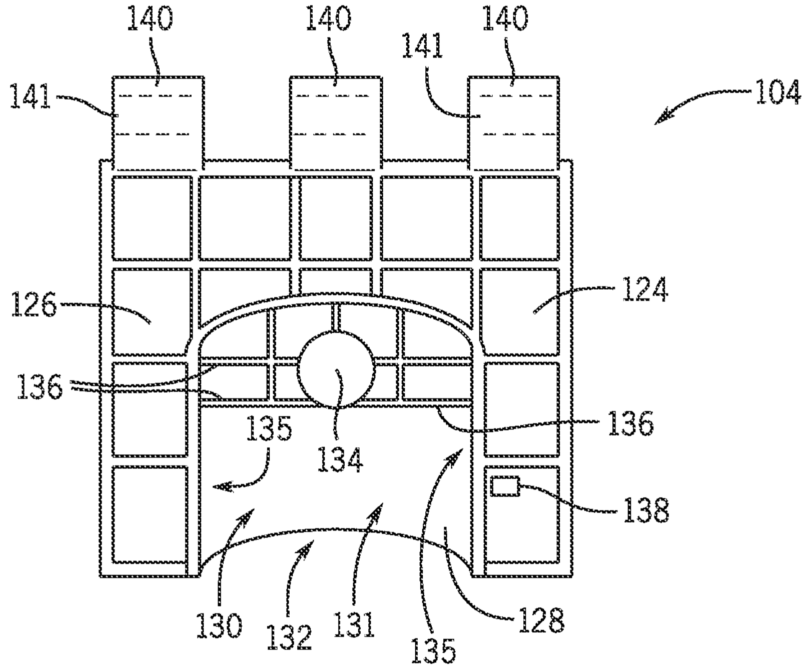
FIG. 5B is a rear perspective view of an embodiment of an actuating portion of a spigot cover, in accordance with an aspect of the present disclosure.
Figure 5C:
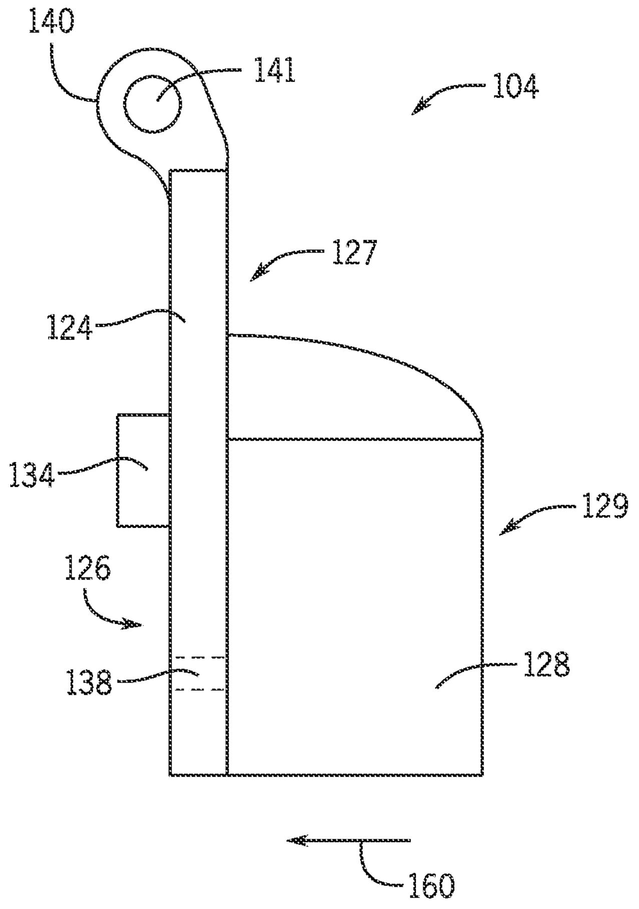
FIG. 5C is a side view of an embodiment of a mounting portion of a spigot cover, in accordance with an aspect of the present disclosure.

FIGS. 5A-5C illustrate various views of embodiments of the actuating portion 104 of the spigot cover 100. For example, FIG. 5A is a perspective view of an embodiment of the actuating portion 104 of the spigot cover 100, FIG. 5B is a rear perspective view of an embodiment of the actuating portion 104, and FIG. 5C is a side view of an embodiment of the actuating portion 104. Turning first to FIG. 5A, the actuating portion 104 may include the base 124 having the first surface 126 (e.g., interior surface) and the second surface 127 (e.g., exterior surface). The hood 128 may extend outwardly from the second surface 127 of the base 124 and may be configured to shield the spigot 60 and limit contact between the spigot 60 and individuals receiving liquid from the spigot 60 and/or between the spigot 60 and the surrounding environment. Further, the actuating portion 104 may include the connection joints 140 having ports 141 formed therein and configured to receive the hinge pin 106 therethrough to couple the actuating portion 104 to the mounting portion 102 in the manner described above. The base 124 of the actuating portion 104 may also include the aperture 138 formed therein. The aperture 138 may be configured to receive an actuation cable of an actuation cable assembly therethrough. The actuation cable may be secured to the actuating portion 104 (e.g., via a bushing, end fitting, bulb, etc.), thereby enabling transfer of a force from the actuation cable to the actuating portion 104, as described in greater detail below.

FIG. 5B is a rear perspective view of an embodiment of the actuating portion 104. As discussed above, the actuating portion 104 includes the protrusion 134, which may extend from an interior surface 131 of the hood 128 and may be configured to engage with the plunger 64 of the spigot 60. Further, the hood 128 may define the cavity 130 and the opening 132 fluidly coupled to the cavity 130. The hood 128 may be configured to direct and/or shield liquid discharged from the spigot 60 to which the spigot cover 100 is coupled. In particular, liquid discharged from the spigot 60 may flow through the cavity 130 and out of the cavity 130 via the opening 132. Reinforcing ribs 136 may extend from the base 124 of the actuating portion 104. For example, the reinforcing ribs 136 may extend from the interior surface 131 of the hood 128, between lateral sides 135 of the hood 128, and/or through the cavity 130. In the installed configuration, the protrusion 134 may extend from the base 124 and/or the hood 128 (e.g., away from the first surface 126 of the actuating portion 104) and towards the plunger 64 of the spigot 60. In an unactuated or resting position, the protrusion 134 may abut the plunger 64 without transferring a force to the plunger 64. Upon application of a force (e.g., from an actuation cable, a manual force applied to the actuating portion 104), the protrusion 134 may transfer the force to the plunger 64 to actuate the plunger 64 and dispense liquid from the liquid container 50. Operation of the spigot cover 100 is described in further detail below.

FIG. 5C is a side view of an embodiment of the actuating portion 104 of the spigot cover 100. As illustrated, the hood 128 may extend outwardly from the base 124 of the actuating portion 104 (e.g., from the second surface 127). In the installed configuration, the cavity 130 defined by the hood 128 may at least partially receive the spigot 60 of the liquid container 50 to which the spigot cover 100 is coupled. Additionally, the protrusion 134 may extend beyond the first surface 126 of the base 124 of the actuating portion 104 in a direction 160 toward the plunger 64 in the installed configuration.

Figure 6:
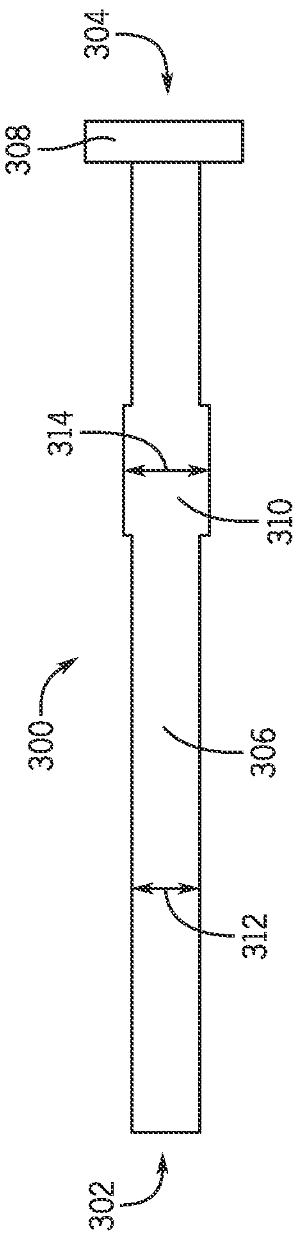
FIG. 6 is a side view of an embodiment of a hinge pin of a spigot cover, in accordance with an aspect of the present disclosure.

FIG. 6 is a side view of an embodiment of a hinge pin 300 (e.g., rod, link, bar) that may be utilized to adjustably couple components (e.g., hinge knuckles) of the spigot cover 100 to one another, in accordance with aspects of the present disclosure. For example, the hinge pin 300 may be an embodiment of the hinge pin 106 described above with reference to FIG. 3. The hinge pin 300 may include a first end 302, a second end 304, and a body 306 extending between the first end 302 and the second end 304. The first end 302 may be configured to pass through connection joints 120, 140 (e.g., hinge knuckles) of the spigot cover 100 to adjustably couple the actuating portion 104 to the mounting portion 102. The second end 304 may include a cap 308 (e.g., a base, a flange, a head) configured to abut one of the connection joints 122, 140 (e.g., one of the connection joints 140) to limit movement of the hinge pin 300 in the assembled configuration of the spigot cover 100. That is, in the assembled configuration, the cap 308 may engage with one of the connection joints 122, 140 to limit movement of the hinge pin 300 relative to the connection joints 122, 140 and maintain the rotatable connection between the mounting portion 102 and the actuating portion 104.

Further, the body 306 of the hinge pin 300 may also include an expanded portion 310 configured to limit lateral or radial movement of the hinge pin 300 relative to the connection joints 122, 140 of the spigot cover 100 in the assembled configuration. For example, the body 306 of the hinge pin 300 may have a diameter 312 and may be configured to pass through ports 123, 141 of the connection joints 122, 140 with limited (e.g., zero or substantially zero) resistance. The expanded portion 310 may have a diameter 314 that is greater than the diameter 312 of the body 306. The diameter 314 of the expanded portion 310 may also be sized to enable the hinge pin 300 to extend through the ports 123, 141 of the connection joints 122, 140. However, because the diameter 314 of the expanded portion 310 is larger than the diameter 312 of the body 306, the expanded portion 310 may at least partially interfere with the connection joints 122, 140 of the spigot cover 100, thereby generating an amount of resistance as the hinge pin 300 is positioned through the connection joints 122, 140 of the spigot cover 100. Upon assembly, the increased resistance provided by the expanded portion 310 may enable the hinge 300 to remain in position (e.g., within the ports 123, 141 of the connection joints 122, 140) to maintain securement of the components of the spigot cover 100 to one another. For example, the increased resistance provided by the expanded portion 310 may limit or avoid unintentional or undesired removal of the hinge pin 300 from the mounting portion 102 and the actuating portion 104.

Figure 7:
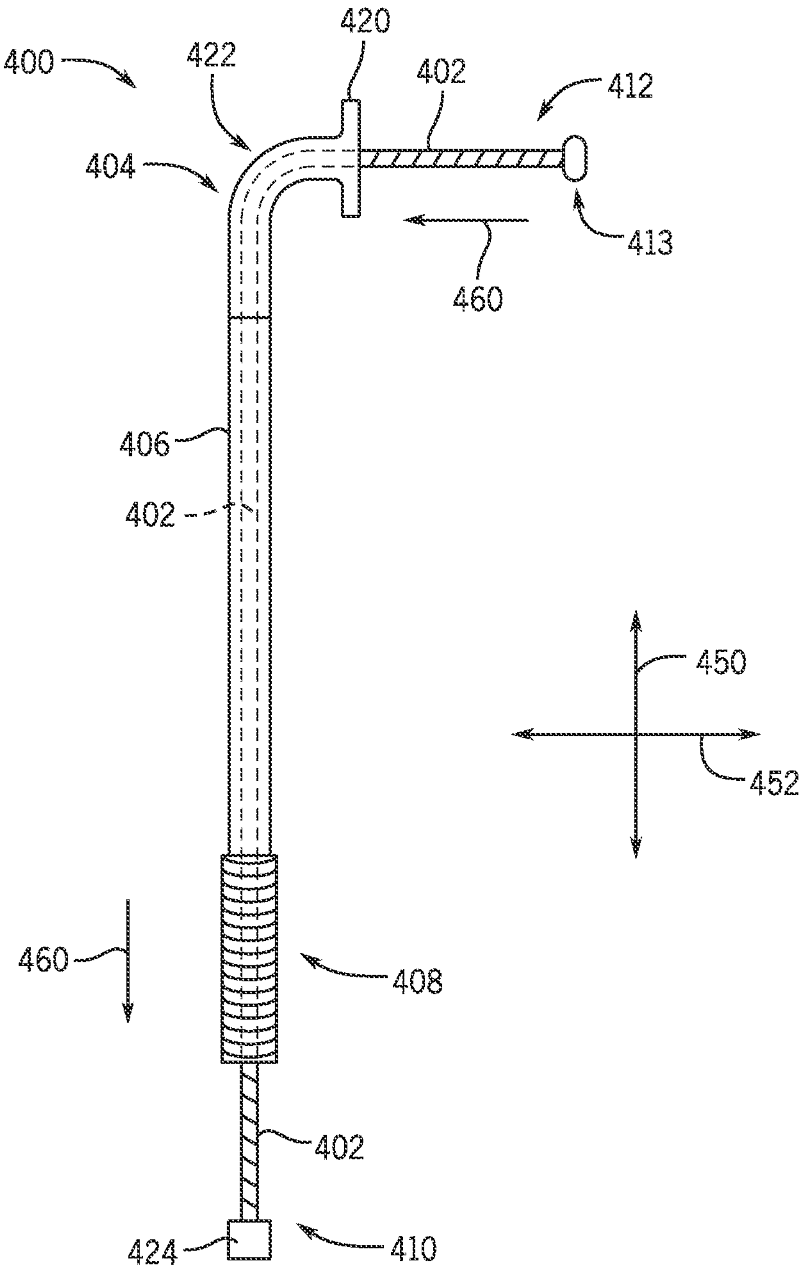
FIG. 7 is a cross-sectional side view of an embodiment of an actuation cable assembly of a liquid dispensing system, in accordance with an aspect of the present disclosure.

FIG. 7 is a cross-sectional side view of an embodiment of an actuation cable assembly 400 (e.g., an actuation cable). As mentioned above, the actuation cable assembly 400 may be utilized with the spigot cover 100 to enable application of a force to the spigot cover 100 and thereby cause actuation of the spigot 60 of the liquid container 50, in accordance with an aspect of the present disclosure. In particular, the actuation cable assembly 400 may enable actuation of the spigot 60 via the spigot cover 100 without physical contact between an individual and the spigot cover 100 and the spigot 60. As illustrated, the actuation cable assembly 400 may include an actuation cable 402 (e.g., a cable, wire, tether, internal tether), a mounting bracket 404, an actuation cable sheath 406 (e.g., sheath), and a bushing 408 (e.g., a brass bushing). In some embodiments, the mounting bracket 404 may be a component of the sheath 406. The actuation cable 402 (e.g., internal tether) may extend through the mounting bracket 404, through the actuation cable sheath 406, and through the bushing 408. The actuation cable 402 may include a first end 410 proximate the bushing 408 and a second end 412 proximate the mounting bracket 404. The actuation cable sheath 406 may be configured to encapsulate or surround a portion of the actuation cable 402 to protect the actuation cable 402 from wear and degradation and to enable desired movement of the actuation cable 402 during transfer of a force to the spigot cover 100.

The mounting bracket 404 may include a mounting plate 420 and an angled portion 422 (e.g., a curved portion). In an assembled configuration of the actuation cable assembly 400 with the spigot cover 100, the mounting plate 420 may be disposed within (e.g., engaged with) the first portion 156 of the retention cavity 154 discussed above with reference to FIG. 4C. Additionally, the angled portion 422 may extend through the second portion 158 of the retention cavity 154 discussed above with reference to FIG. 5C. In some embodiments, the angled portion 422 may be disposed at a substantially 90-degree angle (e.g., between 80 and 100 degrees), thereby directing or guiding a portion of the actuation cable 402 in a direction along a vertical axis 450 (e.g., a first axis) to couple with an actuator (e.g., a foot pedal). Another portion of the actuation cable 402 may extend in a direction along a horizontal axis 452 (e.g., a second axis) to couple with the spigot cover 100 in the assembled configuration. For example, in the assembled configuration, the first end 410 of the actuation cable 402 may be coupled to a foot pedal, and the second end 412 of the actuation cable 402 may be coupled to the actuating portion 104 of the spigot cover 100. In the illustrated embodiment, the actuation cable 402 includes a bulb 413 (e.g., head, stop knob, end fitting) and a ferrule 424 (e.g., bulb, ring, cap). The actuation cable 402 may extend from the mounting plate 420, through the aperture 120 of the mounting portion 102, and through the aperture 138 of the actuating portion 104. The bulb 413, which may be larger than the aperture 138, may be secured to the second end 412 of the actuation cable 402 adjacent the second surface 127 of the actuating portion 104. The ferrule 424 may be secured to the first end 410 of the actuation cable 402 and may be configured to secure the first end 410 of the actuation cable 402 to the actuator (e.g., foot pedal), as described in greater detail below. In this way, the bulb 413 and the ferrule 424 may enable transfer of force from the actuator to the actuation cable 402, and from the actuation cable 402 to the actuating portion 104. Further, the bulb 413 may maintain securement of the actuation cable 402 to the actuation portion 104. Operation of the actuation cable assembly 400 with the spigot cover 100 is described in further detail below.

In operation, the actuation cable assembly 400 may receive a force from an actuator (e.g., a foot pedal) at the first end 410 of the actuation cable 402 and may transfer the force to the actuating portion 104 of the spigot cover 100 coupled to the second end 412 of the actuation cable 402 (e.g., via the bulb 413). For example, upon application of a force 460 to the actuation cable 402 (e.g., via a user stepping on an actuation pedal), the actuation cable 402 may translate (e.g., within the actuation cable sheath 406) in a direction of the force 460. As the actuation cable 402 translates, the force 460 is transferred from the first end 410 of the actuation cable 402 to the second end 412 of the actuation cable 402. As noted above, the second end 412 of the actuation cable 402 may be secured to the actuating portion 104 of the spigot cover 100, and thus the force 460 may be transferred from the actuation cable 402 to the actuating portion 104 of the spigot cover 100. Transfer of the force 460 to the actuating portion 104 causes the actuating portion 104 to rotate about the hinge pin 106 and toward the mounting portion 102. Additionally, the protrusion 134 of the actuating portion 104 is drawn toward the mounting portion 102 to engage and depress the plunger 64 of the spigot 60, thereby enabling the spigot 60 to dispense liquid from the liquid container 50. As will be appreciated, actuation of the spigot 60 in the manner described above avoids direct physical contact between the spigot 60, as well as the spigot cover 100, and an individual receiving liquid from the liquid container 50. For example, the present techniques may be utilized to enable dispensing of liquid from the liquid container 50 without an individual utilizing their hands or fingers to actuate the spigot 60, thereby reducing transfer of contaminants between the spigot 60 and the individual.

Figure 8:
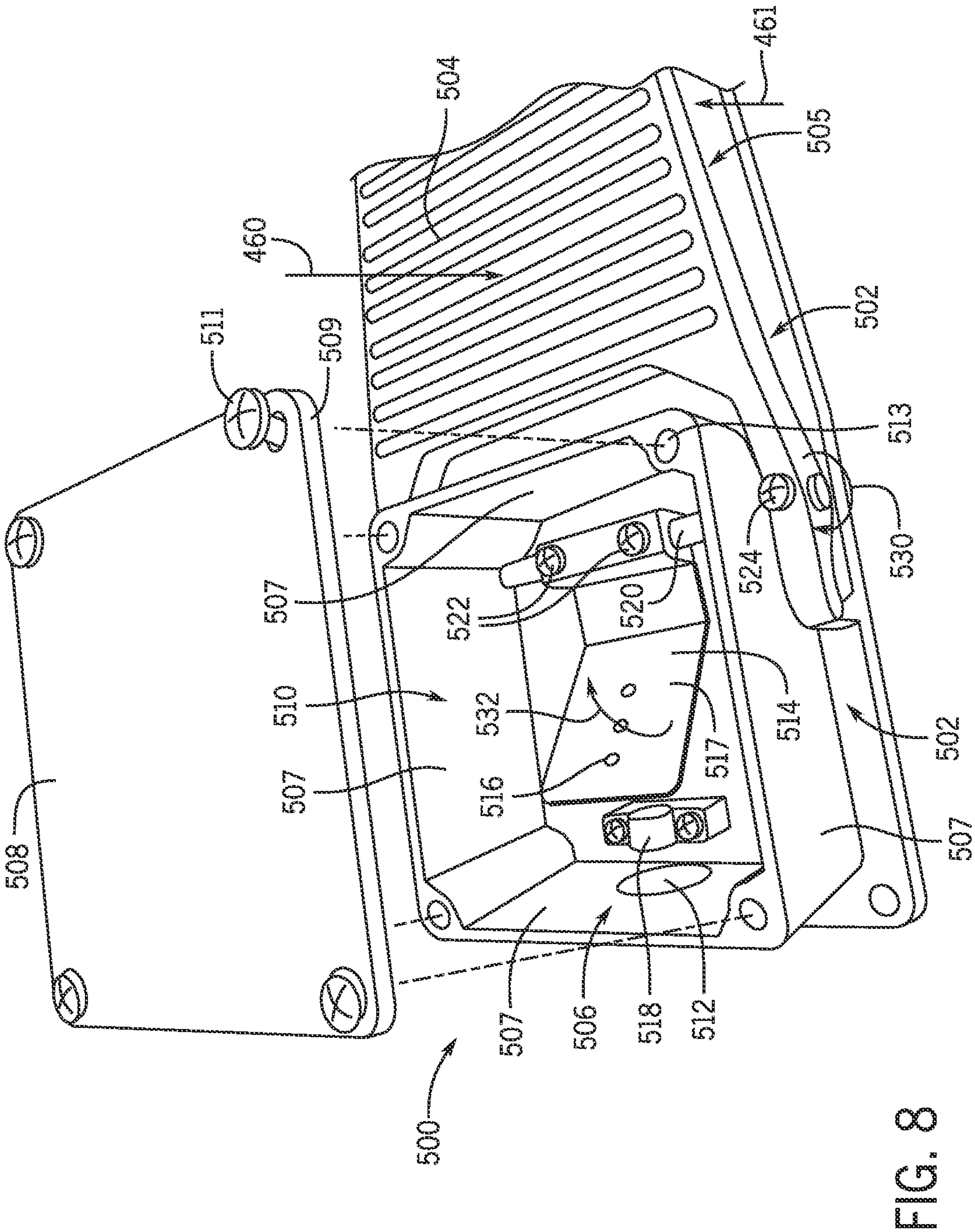
FIG. 8 is a partially exploded perspective view of an embodiment of an actuation pedal of a liquid dispensing system, in accordance with an aspect of the present disclosure.

FIG. 8 is a partially exploded perspective view of an embodiment of an actuation pedal 500 (e.g., a foot pedal, an actuator) utilized to receive and transfer a force to the spigot cover 100 to actuate the spigot 60 of the liquid container 50, in accordance with an aspect of the present disclosure. While the actuation pedal 500 is shown as a foot pedal in the illustrated embodiment, it should be appreciated that any suitable actuator may be utilized in accordance with the present techniques. The actuation pedal 500 may include a base 502, a force receiving portion 504 (e.g., a lever), and a housing 506. The housing 506 may include a plurality of walls 507 extending from the base 502. The housing 506 may also include a top wall 508 configured to couple to the walls 507 to define an internal volume 510 of the housing 506. In some embodiments, a seal 509 may be disposed between the top wall 508 and the walls 507. The top wall 508 may be secured to the walls 507 (e.g., with the seal 509 therebetween) via fasteners 511. For example, fasteners 511 may be configured to pass through the top wall 508 and through the seal 509 to engage with ports 513 formed in the housing 506 to secure the top wall 508 and the seal 509 to the walls 507, thereby forming the housing 506 with the internal volume 510 therein.

An opening 512 may be disposed within one of the walls 507 of the housing 506, and the opening 512 may be configured to receive and engage with the bushing 408 of the actuation cable assembly 400. In some embodiments, the opening 512 may have threads configured to engage with corresponding threads of the bushing 408, thereby enabling securement of the actuation cable assembly 400 to the actuation pedal 500 in an assembled configuration. Various other components of the actuation pedal 500 may be disposed within the internal volume 510 of the housing 506. For example, an angled bracket 514 may be disposed within the internal volume 510 of the housing 506. The angled bracket 514 may include a plurality of apertures 516 configured to enable securement of the actuation cable 402 of the actuation cable assembly 400 to the angled bracket 514. For example, the first end 410 of the actuation cable 402 may extend through one of the apertures 516 may be secured to and/or adjacent a surface 517 of the angled bracket 514. That is, the ferrule 424, which may be larger than the apertures 516, may be secured to the first end 410 of the actuation cable 402 adjacent the surface 517 of the angled bracket 514. Thus, in an assembled configuration, the actuation cable 402 may extend from the surface 517 of the angled bracket 514, through one of the apertures 516, through a guide 518 within the housing 506, and through the opening 512 of the actuation pedal 500 via the bushing 408 of the actuation cable assembly 400. In some embodiments, the coupling between the actuation cable 402 and the angled bracket 514 may be adjusted to adjust a travel distance of the actuation cable 402 when the actuation pedal 500 is actuated. For example, each of the apertures 516 may be associated with a particular travel distance, and thus the travel distance of the actuation cable 402 may depend on the particular aperture 516 through which the actuation cable 402 extends through. That is, a first aperture 516 of the one or more apertures 516 may be associated with a first travel distance for the actuation cable 402, and a second aperture 516 of the one or more apertures 516 may be associated with a second travel distance for the actuation cable 402. Further, in some embodiments, the travel distance of the actuation cable 402 may also be modified by adjusting a position of the ferrule 424 relative to the actuation cable 402. For example, movement of the bulb 424 towards the second end 412 of the actuation cable 402 may decrease the travel distance of the actuation cable 402, while movement of the bulb 424 away from the second end 412 of the actuation cable 402 may increase the travel distance of the actuation cable. As discussed above, the actuation cable 402 may extend further towards the spigot cover 100 of a liquid dispensing system, as described in greater detail below.

The angled bracket 514 may be coupled or secured to an actuation rod 520 via fasteners 522 (e.g., screws). The actuation rod 520 may also be coupled to the force receiving portion 504 via fasteners 524. Thus, the actuation rod 520 may be configured to transfer a force received via the force receiving portion 504 to the angled bracket 514, which in turn may be transferred to the actuation cable 402. For example, in the assembled configuration, the force 460 may be received at the force receiving portion 504 and may be transferred to the actuation rod 520, thereby causing the actuation rod 520 to rotate in a direction 530. As a result, the angled bracket 514 coupled to the actuation bolt 520 may also rotate and move in a direction 532. The actuation cable 402 may be secured to the angled bracket 514, for example, in the manner described above. Thus, upon receiving the force 460 at the force receiving portion 504, the force 460 is transferred from the force receiving portion 504 to the actuation rod 520, from the actuation rod 520 to the angled bracket 514, and from the angled bracket 514 to the actuation cable 402. The force 460 may ultimately be transferred to the spigot 60 of the liquid container 50, as described in greater detail below. In some embodiments, the actuation pedal 500 may also include a spring 505 configured to bias the force receiving portion 504 to a resting or unactuated position when no force is applied to the force receiving portion 504. That is, upon removal of the force 460 to the force receiving portion 504, the spring 505 may apply a reactive force 461 to the force receiving portion 504, thereby biasing the force receiving portion 504 back to an unactuated (e.g., resting) position. As a result, the bracket 514 may also return to an unactuated position, such that the force 460 is no longer transferred via the actuation cable to the spigot cover 100.

Figure 9:
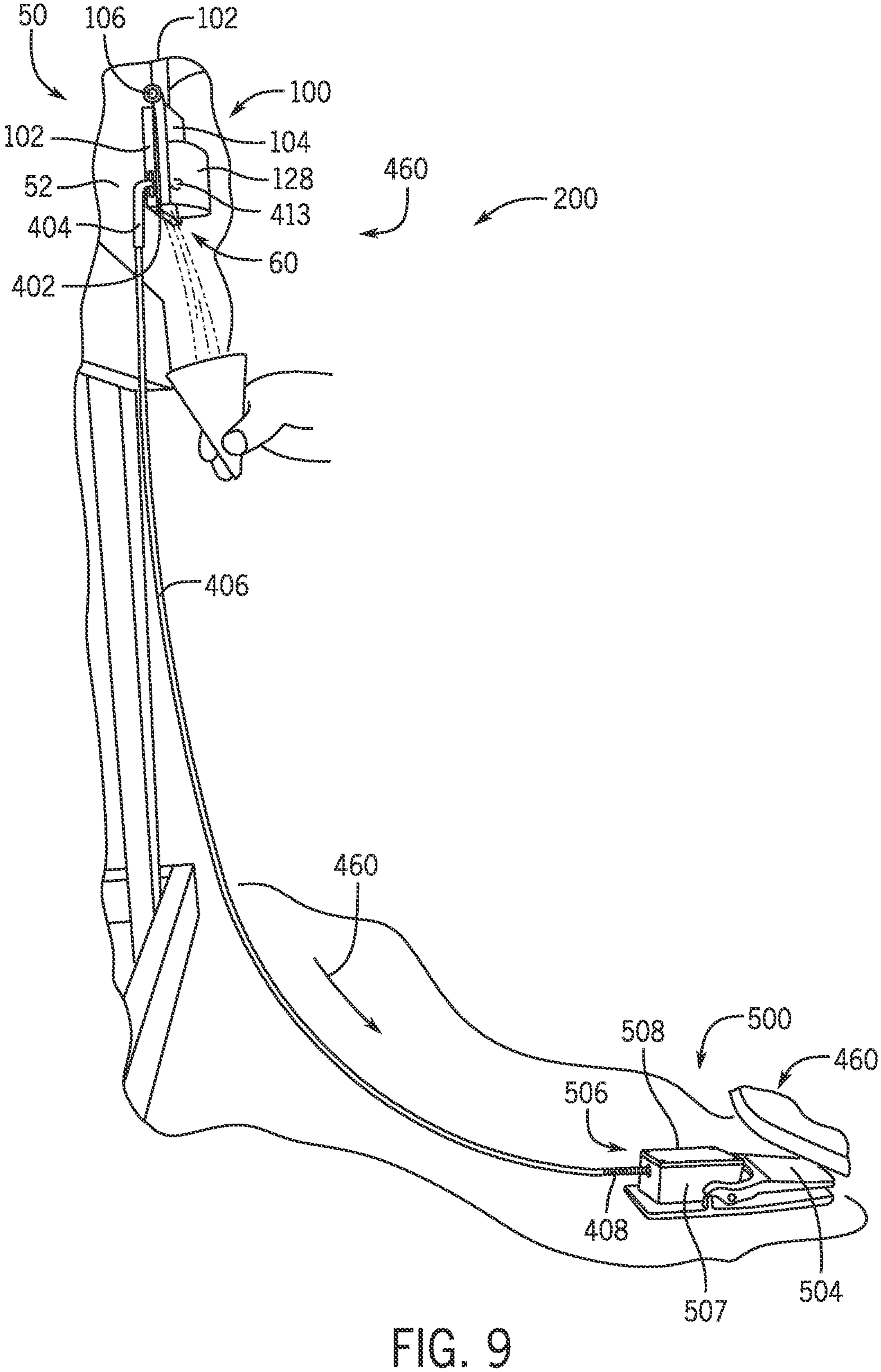
FIG. 9 is a perspective view of an embodiment of a liquid dispensing system having a spigot cover, actuation cable assembly, and actuation pedal, in accordance with an aspect of the present disclosure.

FIG. 9 is a perspective view of an embodiment of a liquid dispensing system 200, illustrating the liquid dispensing system 200 in an installed configuration with the liquid container 50. In the illustrated embodiment, the liquid dispensing system 200 includes the spigot cover 100, the actuation cable assembly 400, and the actuation pedal 500, which are shown in an assembled configuration. As previously described, the mounting portion 102 of the spigot cover 100 may be mounted to the spigot 60 of the liquid container 50, and the actuating portion 104 may be rotatably coupled to the mounting portion 102 via the hinge pin 106. In particular, the spigot cover 100 may be disposed over the spigot 60 and may be configured to limit contact between the spigot 60 and individuals using the spigot 60 and/or between the spigot 60 and the surrounding environment. Thus, the spigot 60 is shielded from exposure to contaminants that may be within the surrounding environment and/or that may be transferred by individuals via physical contact with the spigot 60. Indeed, the presently disclosed techniques may be utilized to enable dispensing of a liquid from the liquid container 50 (e.g., via actuation of the spigot 60) without physical contact between an individual and the spigot 60.

As discussed above, the actuating portion 104 of the spigot cover 100 may be configured to engage with the plunger 64 of the spigot 60 and apply a force to the plunger 64 to dispense liquid from the liquid container 50. More specifically, the first end 410 of the actuation cable 402 may be secured to the actuation pedal 500, and the second end 412 of the actuation cable 402 may be secured to the actuating portion 104 of the spigot cover 100. Thus, the actuation cable 402 may extend from the actuating portion 104, through the mounting portion 102 of the spigot cover 100, through the mounting bracket 404, through the actuation cable sheath 406, through the bushing 408 and to the actuation pedal 500. The actuation cable sheath 406 may be configured to shield the actuation cable 402 from wear and degradation and may also facilitate translation or movement of the actuation cable 402 (e.g., without or substantially without interference) during use of the liquid dispensing system 200. The actuation cable 402 may be configured to transfer the force 460 received at the actuation pedal 500 to the actuating portion 104 of the spigot cover 100, thereby causing the actuating portion 104 to engage and actuate the plunger 64 of the spigot 60 to dispense liquid from the liquid container 50. In some embodiments, the actuation cable 402 may have a length that enables the actuation pedal 500 to rest on a floor or the ground with the spigot cover 100 mounted or secured to the spigot 60 of the liquid container 50 positioned on a table, cabinet, or other surface raised from the ground or floor. For example, the length of the actuation cable 402 may enable the protrusion 134 of the actuating portion 104 to rest against or adjacent the plunger 64 of the spigot 60 when no force is applied to the force receiving portion 504 of the actuation pedal 500. Upon application of the force 460 (e.g., downward force, stepping force) to the force receiving portion 504 of the actuation pedal 500, the actuation cable 402 may transfer the force 460 from the actuation pedal 500 to the actuating portion 104 of the spigot cover 100 in the manner described above. The force 460 applied to the actuating portion 104 causes the actuating portion 104 to rotate or move towards the mounting portion 102 and the liquid container 50, such that the protrusion 134 of the actuating portion 104 engages and depresses the plunger 64 of the spigot 60. In this way, the liquid dispensing system 200 enables dispensing of liquid from the liquid container 50 having the spigot 60 without physical contact of an individual with the spigot 60. Upon removal of the force 460 applied to the actuation pedal 500, the plunger 64 of the spigot 60 may apply a force (e.g., a reaction force) to the protrusion 134 of the actuating portion 104 as the spigot 60 returns to an unactuated (e.g., natural or resting) position, and thus the actuating portion 104 may also return to an unactuated (e.g., natural or resting) position whereby the protrusion 134 rests against or adjacent the plunger 64 of the spigot 60. Further, in some embodiments, a spring element (not shown) may be disposed about the actuation cable 402 between the mounting portion 102 and the actuating portion 104, which may facilitate returning the actuating portion 104 to the unactuated position, as described in greater detail below.

Figure 10:
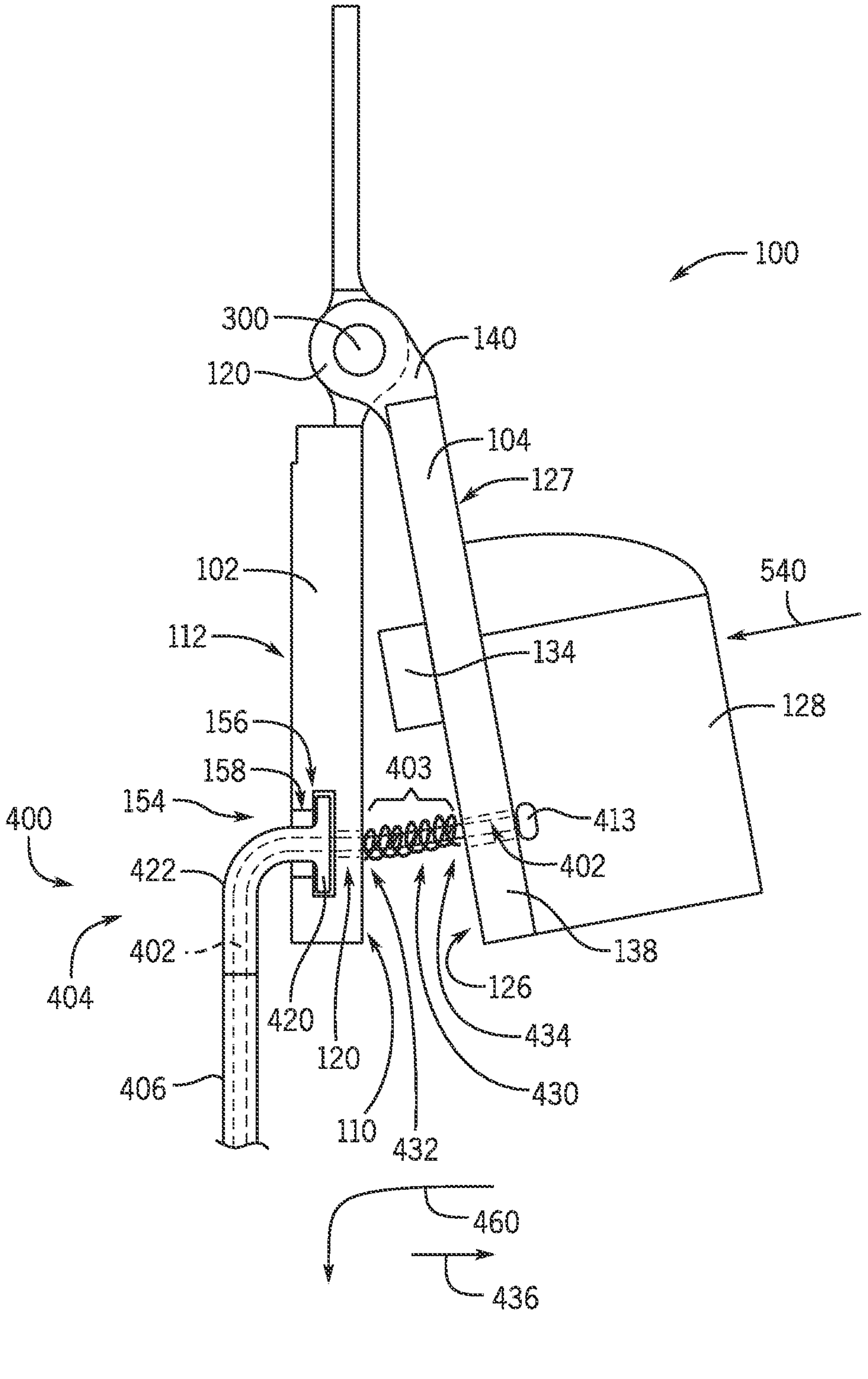
FIG. 10 is an expanded side view of an embodiment of a spigot cover and an actuation cable assembly of a liquid dispensing system, in accordance with an aspect of the present disclosure.

FIG. 10 is an expanded side view of an embodiment of the spigot cover 100 and the actuation cable assembly 400 in an assembled configuration. In the assembled configuration, a portion 403 of the actuation cable 402 may extend between the mounting portion 102 and the actuating portion 104 of the spigot cover 100. For example, as noted above, the actuation cable 402 (e.g., internal tether) may be secured to the actuating portion 104 of the spigot cover 100 via the bulb 413, and may extend through the aperture 138 of the actuating portion 104, between the actuating portion 104 and the mounting portion 102, through the aperture 120 of the mounting portion 102, and through the mounting bracket 404 towards the actuation pedal 500. In operation, the actuation cable 402 may receive the force 460 from the actuation pedal 500 and may transfer the force 460 to the actuating portion 104 of the spigot cover 100, thereby enabling the protrusion 134 to engage with and depress the plunger 64 of the spigot 60 to dispense liquid from the liquid container 50. Upon removal of the force 460 from the actuation pedal 500, the plunger 64 of the spigot 60 may apply a reaction force to the protrusion 134 of the actuating portion 104 as the spigot 60 returns to an unactuated position, thereby enabling the actuating portion 104 to return to an unactuated position.

In some embodiments, a spring element 430 may be disposed around the portion 403 of the actuation cable 402 (e.g., internal tether) between the actuating portion 104 and the mounting portion 102 to facilitate returning the actuating portion 104 to the unactuated position. The spring element 430 may include a first end 432 and a second end 434, and may be configured to abut components of the spigot cover 100 or the actuation cable assembly 400. For example, the first end 432 may abut the first surface 110 of the mounting portion 102 and the second end 434 may abut the first surface 126 of the actuating portion 104. In some embodiments, the first end 432 may abut the mounting plate 420 in the assembled configuration. The spring element 430 may be configured to apply a reaction force 436 to bias the actuating portion 104 back to an unactuated position. For example, upon application of the force 460 via the actuation pedal 500, the spring element 430 may compress as the first surface 126 of the actuating portion 104 is drawn towards the first surface 110 of the mounting portion 102. Upon removal of the force 460 from the actuation pedal 500, the spring element 430 may return to an uncompressed position (e.g., expanded position, resting position). As the spring element 430 returns to the uncompressed position, the inherent elasticity of the spring element 430 may generate the reaction force 436, thereby enabling the actuating portion 104 to return to an unactuated position. That is, as the spring element 430 returns to the uncompressed position, the first end 432 may bias against the mounting bracket 420 or against the first surface 110 of the mounting portion 102 and the second end 434 may bias against the first surface 126 of the actuating portion 104, thereby enabling the actuating portion 104 to return to the unactuated position. Accordingly, the spring element 430 may enable more reliable closure of the spigot 60 when the force 460 is absent, thereby reducing undesirable waste and/or leaking from the liquid container 50. It should be noted that the spring element 430 may be a component of the actuation cable assembly 400 or may be a separate component of the liquid dispensing system 200.

It should be noted that in some embodiments, the actuation cable assembly 400 and the actuation pedal 500 may not be utilized in the liquid dispensing system 200. For example, in some embodiments, the spigot cover 100 may be configured to receive a manual force 540 applied to the second surface 127 and/or the hood 128 of the actuating portion 104 from an individual. Application of the manual force 540 to the actuating portion 104 may cause rotation of the actuating portion 104 relative to the mounting portion 102 and enable the protrusion 134 of the actuating portion 104 to engage with and actuate the plunger 64 of the spigot 60 to dispense liquid from the liquid container 50. That is, the manual force 540 causes the actuating portion 104 to rotate or move toward the mounting portion 102 and the liquid container 50, such that the protrusion 134 of the actuating portion 104 engages and depresses the plunger 64 of the spigot 60. In this way, the spigot cover 100 enables dispending of liquid from the liquid container 50 having the spigot 60 without physical contact (e.g., direct physical contact) between an individual and the spigot 60.

As set forth above, the present disclosure may provide one or more technical effects useful in liquid dispensing systems. Embodiments of the disclosure may include a liquid dispensing system having a spigot cover configured to be disposed over a spigot of a liquid container. The spigot cover may be configured to shield the spigot of the liquid container from contact with individuals and from contaminants within a surrounding environment. The spigot cover may also be configured to actuate the spigot to enable dispensing of liquid from the liquid container. In this way, the liquid dispensing system and the spigot cover of the present disclosure reduce, limit, and/or block contact between the spigot and the surrounding environment and between the spigot and individuals utilizing the liquid container to dispense the liquid therein, thereby limiting exposure and/or transfer of contaminants to the spigot and/or to the individuals. The technical effects and technical problems in the specification are examples and are not limiting. It should be noted that the embodiments described in the specification may have other technical effects and can solve other problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A spigot cover, comprising:

a mounting portion configured to mount to a spigot of a liquid container; and an actuating portion adjustably coupled to the mounting portion, wherein the actuating portion comprises:

a protrusion configured to engage with a plunger of the spigot;

a base portion; and a hood extending outward from the base portion, wherein the hood is configured to block access to the spigot.

2. The spigot cover of claim 1, wherein the actuating portion is rotatably coupled to the mounting portion via a hinged connection.

3. The spigot cover of claim 1, wherein the hood defines a cavity and an opening fluidly coupled to the cavity, and the hood is configured to enable liquid flow from the spigot, through the cavity, and out of the opening.

4. The spigot cover of claim 3, wherein the protrusion is disposed at least partially within the cavity.

5. The spigot cover of claim 4, wherein the actuating portion comprises reinforcing ribs extending from the hood and through the cavity.

6. The spigot cover of claim 5, wherein the protrusion extends from the reinforcing ribs, through the cavity, and toward the plunger in an installed configuration of the spigot cover with the liquid container.

7. The spigot cover of claim 1, wherein the mounting portion comprises a base and a mounting flange extending from the base to define a mounting recess configured to receive a lip of the spigot, and the base and the mounting flange are configured to capture the lip of the spigot within the mounting recess to mount the spigot cover to the spigot.

8. The spigot cover of claim 7, wherein the mounting flange and the mounting recess each comprises a semi-circular geometry.

9. The spigot cover of claim 1, wherein the mounting portion comprises a retention cavity formed therein, the mounting portion is configured to capture and retain a bracket of an actuation cable assembly within the retention cavity, and the mounting portion comprises an aperture formed therethrough and aligned with the retention cavity.

10. The spigot cover of claim 1, wherein the mounting portion and the actuating portion are coupled to one another via a hinge pin, the mounting portion comprises a first portion configured to couple to the spigot and a second portion configured to abut the liquid container in an installed configuration of the spigot cover with the liquid container, the first portion is disposed on a first side of the hinge pin, and the second portion is disposed on a second side of the hinge pin opposite the first side.

11. The spigot cover of claim 1, wherein the mounting portion is a first injection-molded piece, and the actuating portion is a second injection-molded piece.

12. A liquid dispensing system, comprising:

a spigot cover configured to mount to a spigot of a liquid container, wherein the spigot cover is configured to actuate the spigot and shield the spigot from contact with an individual utilizing the liquid dispensing system; and an actuation cable assembly configured to be secured to the spigot cover, wherein the actuation cable assembly comprises a sheath and an internal tether disposed within the sheath, wherein the sheath is configured to engage with a first portion of the spigot cover, the internal tether extends from the sheath, through the first portion, and is configured to couple to a second portion of the spigot cover, and the actuation cable assembly is configured to transfer a force to the spigot cover to actuate the spigot.

13. The liquid dispensing system of claim 12, wherein the spigot cover comprises the first portion and the second portion adjustably coupled to one another, the first portion is configured to mount to the spigot, and the second portion is configured to transfer the force to a plunger of the spigot to actuate the spigot.

14. The liquid dispensing system of claim 13, comprising an actuation pedal, wherein the internal tether comprises a first end and a second end, the first end is coupled to the second portion of spigot cover in an assembled configuration of the liquid dispensing system, the second end is coupled to the actuation pedal in the assembled configuration, and the actuation pedal is configured to receive and transfer the force to the actuation cable.

15. The liquid dispensing system of claim 14, wherein the actuation pedal is a foot pedal.

16. A liquid dispensing system, comprising:

a spigot cover configured to mount to a spigot of a liquid container, wherein the spigot cover comprises:

a mounting portion configured to mount to the spigot of the liquid container, wherein the mounting portion comprises a first portion configured to couple to the spigot and a second portion configured to abut the liquid container in an installed configuration of the spigot cover with the liquid container; and an actuating portion adjustably coupled to the mounting portion, wherein the actuating portion is configured to shield the spigot from contact with an individual utilizing the liquid dispensing system;

an actuation cable assembly configured to couple to the spigot cover and configured to transfer a force to the actuating portion of the spigot cover to actuate the spigot; and an actuation pedal configured to couple to the actuation cable assembly and configured to receive the force and transfer the force to the actuation cable assembly.

17. The liquid dispensing system of claim 16, wherein the actuating portion is rotatably coupled to the mounting portion via a hinged connection.

18. The liquid dispensing system of claim 16, wherein the actuating portion comprises:

a protrusion configured to engage with a plunger of the spigot;

a base portion; and a hood extending outward from the base portion, wherein the hood defines a cavity and an opening fluidly coupled to the cavity, and wherein the protrusion is disposed at least partially within the cavity.

19. A spigot cover, comprising:

a mounting portion configured to mount to a spigot of a liquid container, wherein the mounting portion comprises a base and a mounting flange extending from the base to define a mounting recess configured to receive a lip of the spigot, and the base and the mounting flange are configured to capture the lip of the spigot within the mounting recess to mount the spigot cover to the spigot; and an actuating portion adjustably coupled to the mounting portion, wherein the actuating portion comprises a protrusion configured to engage with a plunger of the spigot.

20. A spigot cover, comprising:

a mounting portion configured to mount to a spigot of a liquid container, wherein the mounting portion comprises a retention cavity formed therein, and the mounting portion is configured to capture and retain a bracket of an actuation cable assembly within the retention cavity; and an actuating portion adjustably coupled to the mounting portion, wherein the actuating portion comprises a protrusion configured to engage with a plunger of the spigot.

* * * * *